Nov. 22, 1938.                H. L. ANDERSON                2,137,560
                           BARREL TRANSPORT TRUCK
                           Filed March 28, 1938
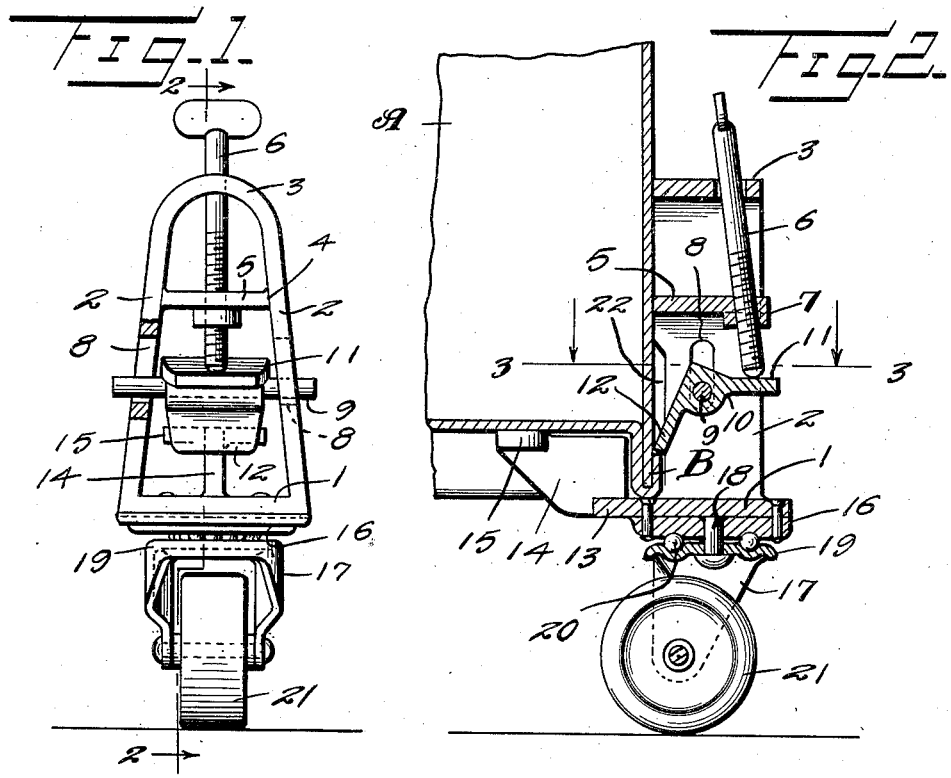
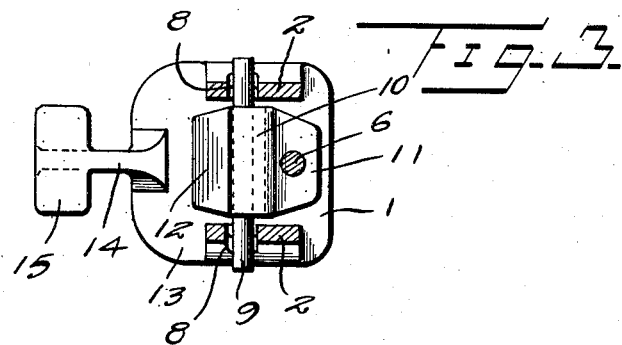
H. L. Anderson
INVENTOR
BY Victor J. Evans & Co.
ATTORNEYS Patented Nov. 22, 1938

2,137,560

UNITED STATES PATENT OFFICE 2,137,560

BARREL TRANSPORT TRUCK

Harold L. Anderson, Lincoln, Nebr.

Application March 28, 1938, Serial No. 198,533

2 Claims. (Cl. 16—30)

This invention relates to trucks of the type to be attached to certain articles such as barrels, drums, boxes and the like, for transporting the same, and its general object is to provide a caster bearing truck of that character, which can be easily and expeditiously attached and removed with respect to an article, but casual removal or displacement is practically impossible.

A further object is to provide a truck that will take up minimum space, and will allow the article to be evenly balanced and transported thereon, with ease and minimum effort on the part of the user.

Another object is to provide a truck that is light in weight, yet is strong and sturdy to perform its intended function without damage or breakage thereof, is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a rear view of the truck which forms the subject matter of the present invention.

Figure 2 is a vertical sectional view taken therethrough and illustrates the same applied to a metallic drum or the like.

Figure 3 is a sectional view taken approximately on line 3—3 of Figure 2, looking in the direction of the arrows.

Referring to the drawing in detail, the letter A indicates a metallic drum, barrel or the like, and B the end rib or bead, and while I have illustrated my truck as being attached to an article of that character, it will of course be understood that it can be used with any type of article that includes a rib or bead, as shown.

The truck includes a base plate 1 which has formed thereon and rising therefrom the arms 2 of an inverted substantially U-shaped body 3, and the arms thereof are preferably disposed in converging relation with respect to each other, from their connection with the base plate, as best shown in Figure 1.

Formed on the arms at 4 and bridging the same is a cross member 5 having a threaded opening therein centrally thereof adjacent its rear edge to threadedly receive a thumb screw 6 which extends through an opening in the bight portion of the body, as best shown in Figure 2. The cross member about the threaded opening thereof is reinforced by a boss 7 formed on the undersurface thereof.

The arms of the body have slots 8 extending longitudinally therein and disposed diametrically opposite each other for the purpose of receiving the end portions of a pivot pin 9 of the lock plate 10 which is of angle formation to provide a rearwardly directed tongue 11 for disposal in the path of the lower end of the thumb screw for the latter to bear thereagainst, as shown, and a forwardly and downwardly inclined tongue 12 which is engageable with the outer flange of the rib or bead B, for locking the truck with respect to the barrel or the like, as clearly shown in Figure 2, it being obvious that the thumb screw bears against the tongue 11 and holds the tongue 12 in bearing engagement with the rib flange.

The base plate 1 is of a length to extend beyond the body, for disposal below the drum or the like, and formed on or otherwise secured to the extending portion 13 for disposal forwardly thereof is a supporting lug 14 of substantially T-shape formation, in that it includes a flange head 15 on the outer end thereof to bear against the bottom of the drum.

Riveted or otherwise secured to the base plate 1 is a caster that includes an upper plate 16 and a yoke 17 journaled thereto by a stud 18 and having a disk shaped upper portion 19 which together with the upper plate 16, have annular grooves therein providing a race for balls 20, and the arms of the yoke have a wheel 21 journaled between the same, as shown.

The forward portions of the arms 2 are preferably reduced as at 22, so that the upper portions of the arms and the bight portion thereof are disposed in bearing association with the drum, to materially relieve strain on the lock plate.

From the above description and disclosure of the drawing, it will be obvious that I have provided a truck which can be readily applied and removed with respect to a drum or the like, and when applied thereto, the rib or bead B is disposed between the body and the rear end of the supporting lug 14, with the upper portion of the body bearing against the vertical wall of the drum, the tongue 12 against the bead, and the head 15 against the bottom of the drum. When transporting heavy articles such as filled drums, it is not necessary to use the lock plate, as the weight of the article will prevent casual removal or displacement of the truck. However, the lock plate can be readily applied in position for use, merely by the use of the thumb screw, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An article transporting truck comprising a base, an inverted substantially U-shaped body formed on and rising from the base and having diametrically opposed slots in the arms thereof, a headed supporting lug extending forwardly from the base and spaced from the body to receive a portion of the article between the same and for the article to rest upon the lug, a caster secured to the base, a lock plate pivoted between the arms and having the pivots thereof mounted in the slots, said lock plate being engageable with the article and a thumb screw mounted in the body and engaged with the lock plate for holding the latter in operative position for securing the truck to the article.

2. An article transporting truck comprising a base, an inverted substantially U-shaped body formed on and rising from the base and having diametrically opposed slots in the arms thereof, a substantially T-shaped supporting lug extending forwardly from the base and spaced from the body to receive a portion of the article between the same and for the article to rest upon the lug, a caster secured to the base, an angle lock plate disposed between the arms, a pivot pin for the lock plate and mounted in the slots, one angle portion of the lock plate being engageable with the article, and a thumb screw threadedly mounted in the body and engageable with the other angle portion of the lock plate for holding the latter in operative position for securing the truck to the article.

HAROLD L. ANDERSON.